Feb. 25, 1964     C. E. HAWK     3,122,213
MEANS FOR ORIENTING TOOLS IN WELL BORES
Filed March 23, 1961     3 Sheets-Sheet 1

INVENTOR.
CHARLES E. HAWK
BY
ATTORNEYS

United States Patent Office 3,122,213
Patented Feb. 25, 1964

3,122,213
MEANS FOR ORIENTING TOOLS IN WELL BORES
Charles E. Hawk, Houston, Tex., assignor to Sperry-Sun
Well Surveying Company, Houston, Tex., a corporation of Delaware
Filed Mar. 23, 1961, Ser. No. 97,890
5 Claims. (Cl. 175—45)

The invention relates to the orientation of tools in bore holes and more particularly to means providing an indication at the surface when a whipstock, for example, has attained a predetermined orientation.

In directional drilling and sidetracking operations it is necessary that deflecting tools, such as whipstocks, knuckle joints and other devices, be oriented within the well bore so that the actual drilling may be carried out in a desired direction. There are various methods of determining orientation, one of the most common of which entails making a record of a magnetic compass reading of a tool position with respect to the low side of the bore, and then bringing the record to the surface for reading thereof. The tool may then be rotated in accordance with the information obtained and a new record taken, and so on until the desired orientation is obtained.

The disadvantages of such prior art methods are that the instrument must be removed from the drill stem and the record, for example of the photographic type, must be removed from the instrument and developed or otherwise requires manipulation and consumption of time before the record can be interpreted. Furthermore, heretofore employed apparatus have required timing devices and other involved mechanical or electrical apparatus to control their operation so that the record is made at the desired time and when the instrument is in the desired location at the bottom of the drill stem. In the case of photographic instruments, the operation of the instrument is unsatisfactory under high temperature well conditions.

The difficulties and disadvantages of prior art tool orientation methods are effectively minimized or overcome in accordance with the present invention, which contemplates the use of the mud pressure in the well to indicate when a predetermined azimuthal position of a tool has been attained. As is well-known in drilling operations there is commonly employed a circulatory flow of mud, air or gas, for purposes such as cooling, lubrication and carrying cuttings out of the hole. As will be described hereafter, means sensitive to azimuthal position may be provided in association with the tool or drill stem to affect the pressure of the circulating medium in a particular manner when a predetermined orientation exists, this pressure effect being detectable and measurable at the surface. For example, in an illustrative embodiment of the invention valve means interposed within the drill stem permit the flow of the circulating medium only when the desired orientation is reached, as evidenced for example by a pendulus element.

Accordingly, it is the main object of the invention to provide means for producing at a point remote from a tool in the bore hole an indication of that tool's orientation, without the need of lowering the means for producing a record into the hole and retrieving the record for reading at the surface.

It is a further object to provide an instrument for orienting tools in a bore hole which is usable under a wide range of hole inclinations.

It is a further object to provide means which may be connected at the lower end of the drill string to produce an effect on pressure of the mud or other circulating medium that may serve as an indication of tool orientation.

Further objects and advantages will become apparent from the following description read in conjunction with the accompanying drawings, in which.

Figure 1:
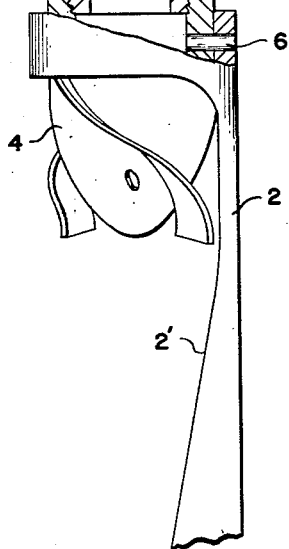
FIGURE 1 illustrates, partly in axial cross-section, the instrument according to the invention when located in the drill string.

Referring to FIGURE 1, the tool, in the illustrated case a whipstock, is indicated at 2 and is connected to a drill bit 4 by a shear pin 6 which, as is well-known, may be sheared by applying pressure through the drill stem to set the whipstock in position. It will be understood that the purpose of the invention is to locate the face 2' of the whipstock, for example, so that it has a particular azimuthal direction. The drill 4 is threaded to a coupling 8 which, through a reduction coupling 10 and tubular section 12 interposed therebetween is connected to the drill stem 14. Couplings 8 and 10 and section 12 serve to house the instrument 16, which is the main subject-matter of the invention, the instrument 16 being held against rotation by means of a threaded lug 18 in section 12.

Figure 2:
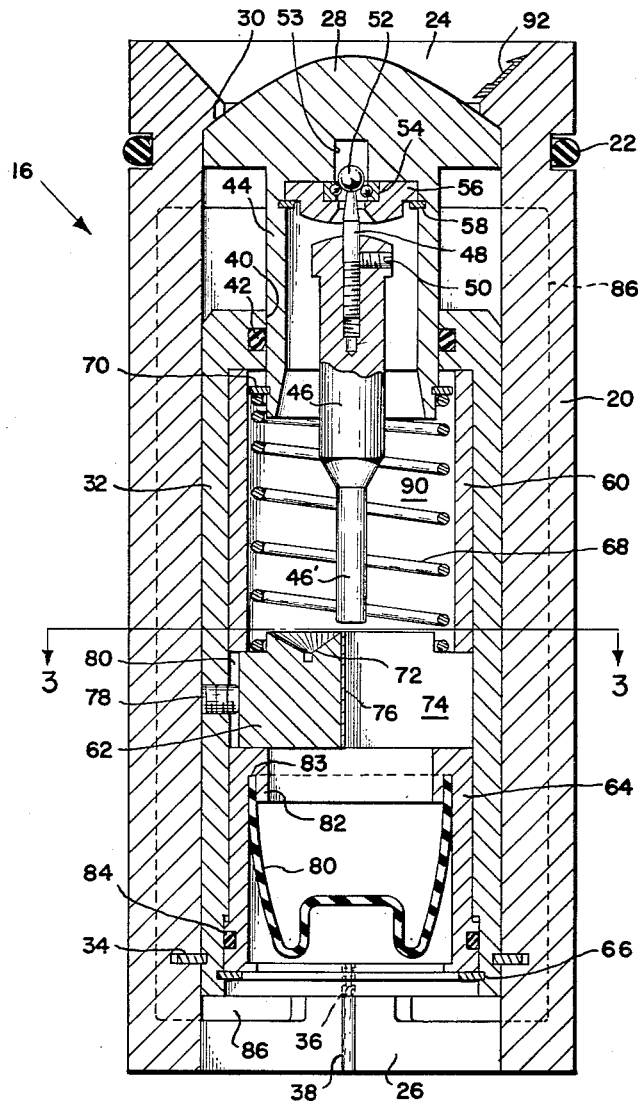
FIGURE 2 is an enlarged axial cross-section of the instrument.

Referring to FIGURE 2, the instrument is indicated at 16 and comprises an internally slotted tubular cage 20 which is adapted to be sealed against section 12 by means of a rubber sealing ring, or O-ring 22. Cage 20 is open at its ends 24 and 26 for the ingress and egress, respectively, of the circulating medium.

Slidably received within cage 20 is a valve member 28 having an upper domed surface adapted to fit within an inwardly directed flange surface 30 formed in casing 20. A tubular sleeve 32 is held within cage 20 by snap ring 34. Sleeve 32 is restrained from rotation within casing 20 by a key 36 on sleeve 32 adapted for reception by a slot 38 in cage 20 or, alternatively, sleeve 32 may be force-fitted to sleeve 20. At its upper end sleeve 32 has a bore 40 and a sealing ring 42 adapted for fluid-tight sliding engagement with a tubular extension 44 of valve 28.

A plumb bob or pendulum 46 is suspended by a stem 48 threaded therein and set by a screw 50, which stem has a spherical end 52 adapted to be supported for frictionless pivotal movement by a ball bearing 54. Bearing 54 is mounted at the mouth of a short bore 53 in valve 28 by an annular collar 56 secured therein by a snap ring 58.

Figure 3:
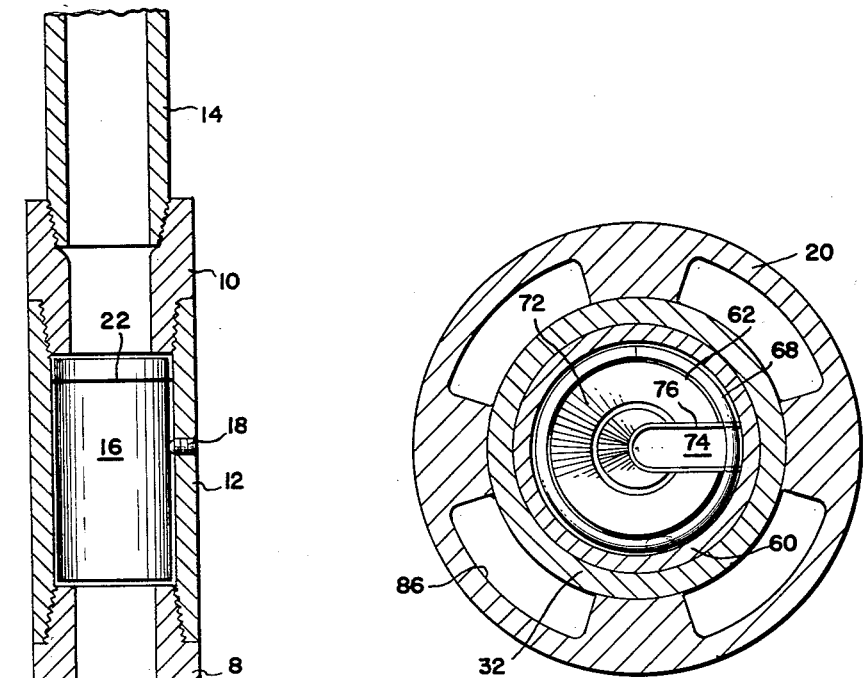
FIGURE 3 is a transverse cross-section taken on line 3—3 of FIGURE 2.

A spacer 60, a round block 62 and a sleeve 64 are nested within sleeve 32 and retained therein by snap ring 66. A coil spring 68 is bottomed against block 62 and presses against a snap ring 70 on extension 44 to normally force the valve 28 against surface 30. It will be seen that there is a broad V-shaped channel 72 extending circularly around part of the upper face of block 62. The continuity is interrupted, however, by a slot 74 extending the thickness of block 62 and having a thin but rigid liner 76 provided therein. The inside width of slot 74 (FIGURE 3) is slightly greater than the diameter of end 46' of pendulum 46. Block 62 is prevented from turning within sleeve 32 by means of a set screw 78 received in a keyway 80 in block 62.

Lower sleeve 64 has a flange 82 providing an annular groove 83 within which a rubber diaphragm 81 is sealed for example by cementing. Sleeve 64 also is provided with a sealing ring 84 acting against sleeve 32.

Figure 4:
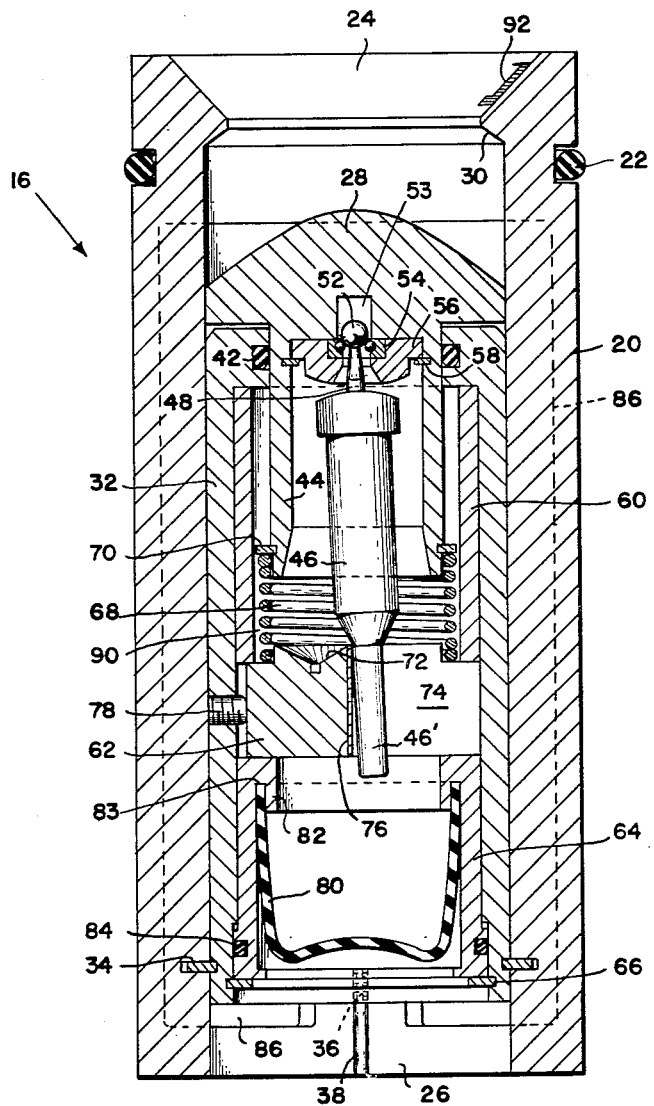
FIGURE 4 is a view similar to FIGURE 2 but showing the condition of the instrument when a desired tool orientation has been attained.

Intermediate the ends of cage 20 there are formed longitudinal channels 86 suited to accommodate flow of mud around the outside of sleeve 32. It will be apparent, therefore, that as valve 28 is moved downwardly sufficiently to uncover ports or channels 86 as shown in FIGURE 4, the circulating mud or other medium may flow through end 24, past surface 30 and valve 28, through channels 86 and out through end 26; thence it may flow through the drill bit 4. However, when valve 28 is in the position shown in FIGURE 2, the flow or circulating medium to the drill is effectively cut off and this condition will be registered by an increase in pressure at the surface. Whether or not valve 28 is free to move downwardly—under the pressure of circulating medium in drill stem 14—is determined by pendulum 46. If the downward movement of pendulum 46 is obstructed by its engagement within channel 72 or by insert 76, then movement of valve 28 is limited. The purpose of inclined channel 72 is this, that if the pendulum 46 deviates off center, let us say to the left in FIGURE 2, the channel will cam the pendulum away from the slot. The insert 76 is provided to guard against the possibility that if pendulum 46 deviates only a few degrees from the slot 74 (in other words a slight distance in a direction which would be viewed as above or below the slot in FIGURE 3) the channel 72 might cam the pendulum back into the slot and result in an incorrect operation. With the provision of insert 76, however, in such a case the bottom of the pendulum will be effectively flatly bottomed against the upper edge of insert 76. However, if pendulum 46 deviates off-center in the same radial direction as slot 74, then the downward fluid pressure on valve 28 will merely project pendulum 46 downward through slot 74 (FIGURE 4) and the valve will be free to uncover channels 86 for the free passage of fluid. The operation, however, will be discussed more fully hereafter.

Chamber 90, defined by the interiors of valve 28, sleeve 32 and diaphragm 80, is filled with oil. It is desirable, of course, to prevent leakage from or to chamber 90 and this may be accomplished by maintaining an equalization of pressure between chamber 90 and the outside—where the pressure is that of the circulating medium. It is for this reason that flexible diaphragm 80 is provided. It will be evident also that without means such as diaphragm 80, upon downward movement of valve 28 to the position shown in FIGURE 4 the pressure upon the incompressible oil would tend to force it outwardly past sealing rings 42 and 84. However, diaphragm 80 is free to expand and contract to compensate for movement of valve 28 and also, since it is acted upon at its exterior by fluid pressure, to equalize the outer and inner fluid pressures.

It will be noted that slot 74 is fixed in its radial direction with respect to cage 20 by means of a screw 78, and that cage 20 may be turned within tubing section 12—and also with respect to whipstock 2—simply by loosening set screw 18. In order that workmen may adjust slot 74 to any given relationship with the face 2', it will be noted from FIGURE 2 that a mark, such as an arrow 92, is stamped, painted or etched on cage 20 to indicate the direction of slot 74.

The operation of the instrument will now be described: It will be understood that prior to the setting of a tool such as a whipstock to face in a particular direction the well will have been surveyed and the angle of inclination and azimuthal direction of the bore at the point where the tool is to be oriented will be known. If instrument 16 is lowered to that point, the pendulum 46 will deviate from its FIGURE 2 position in the direction of the low side which, as known from the survey, is 180° from the well's azimuthal direction. The complete assembly, including the whipstock 2, drill bit 4, and instrument 16, is lowered into the hole to the point where the tool, whipstock 2, is to be set. Connection of the circulating pumps is made to pump a medium such as mud down through the drill stem 14, the pumps are started and the pressure is observed. If a higher than normal pressure is observed it indicates that valve 28 and pendulum 46 have been forced downwardly by fluid pressure but that pendulum 46, rather than dropping through slot 74, was obstructed in its downward movement by the portions of block 62 adjacent slot 74. The valve 28 cannot, therefore, move downwardly sufficiently to expose the upper ends of passages 86 and the high fluid pressure observed is due to the obstruction to circulatory flow. Accordingly, the pumps are cut off while the complete drill string is rotated through a small increment of movement. The interruption of pumping pressure permits spring 68 to raise pendulum 46 free of block 62. Pumping is resumed and if again an abnormally high pressure is indicated it is assumed that the tool still has not been rotated to its intended position and another increment of rotation is necessary. If, however, after a succession of increments of rotation a drop in the fluid pressure is indicated it will be assumed that slot 74 finally has been moved to a position underneath inclined pendulum 46, allowing valve 28 to move downwardly and permit flow to drill 4. The whipstock 2 has then been oriented so that it faces in the proper desired direction. In the latter instance the condition of the instrument is as illustrated in FIGURE 4. The whipstock then is driven into position and the pin 6 is sheared to free the whipstock from the drill string.

In the above described embodiment of the invention the pendulum 46 and valve 28 are axially movable, while the valve seat 30 and block 62 are axially fixed. The relative movement between pendulum 46 and block 62 to permit or prevent opening of the valve may also be effected by connecting the movable element of the valve to the block 62, the pendulum 46 then being fixed.

It will be understood also that various departures from the specifically disclosed embodiment of the invention may be made without departing from the scope thereof as defined by the following claims.

What is claimed is:

1. A device for producing a signal indicative of an inclined orientation of the device in a particular azimuthal direction as distinguished from any other orientation of said device comprising; casing means of a size sufficiently small to be secured within a hollow drill stem through which drilling fluid is circulated, valve means mounted within said casing for regulating the flow of said fluid therethrough, and thereby producing said signal, said valve means being exposed to the pressure of said drill-in fluid tending to open said valve, a rigid pendulum, means connecting the upper end of said pendulum to said valve means so as to permit free pendular motion of the lower end of said pendulum, abutment means mounted in said casing for abutting the free end of said pendulum, the configuration of said abutment means being such as to abut the lower end of said pendulum and thereby prevent the opening of said valve means when the device is orientated in any position other than inclined in said predetermined azimuthal plane, said configuration being such as to avoid abutment with the lower end of said pendulum and thereby permit said valve means to open only when the device is inclined in said predetermined azimuthal direction.

2. The device as claimed in claim 1 including means defining a sealed chamber surrounding said pendulum, passage means having an inlet connected to said valve means for providing a flow path for said drilling fluid externally of said chamber, said valve means including a movable valve body in sliding frictional engagement with said casing means, said valve body being positioned between said chamber and said inlet to said passage means when said valve means are open so that said valve body and said casing means form an additional seal between said chamber and said inlet to said passage means.

3. The device as claimed in claim 2 wherein said valve body contains an internal cavity, said pendulum connecting means being positioned within said cavity.

4. The device as claimed in claim 2 including biasing means positioned within said sealed chamber for biasing said valve body into closed position.

5. The device as claimed in claim 2 including a liner member cooperating with said valve body to form a portion of said sealed chamber and further cooperating with said casing means to form said passage means.

References Cited in the file of this patent
UNITED STATES PATENTS

| | | |
|---|---|---|
| 2,046,956 | Lynch | July 7, 1936 |
| 2,824,380 | Nelson | Feb. 25, 1958 |
| 2,887,298 | Hampton | May 19, 1959 |
| 2,953,350 | Moore | Sept. 20, 1960 |